(12) United States Patent
Ray et al.

(10) Patent No.: US 12,400,122 B2
(45) Date of Patent: Aug. 26, 2025

(54) NARRATIVE-BASED CONTENT DISCOVERY EMPLOYING ARTIFICIAL INTELLIGENCE

(71) Applicant: RivetAI, Inc., Culver City, CA (US)

(72) Inventors: Debajyoti Ray, Culver City, CA (US); Walter Kortschak, Culver City, CA (US)

(73) Assignee: RIVETAI, INC., Culver City, CA (US)

( * ) Notice: Subject to any disclaimer, the term of this patent is extended or adjusted under 35 U.S.C. 154(b) by 1183 days.

(21) Appl. No.: 17/171,167

(22) Filed: Feb. 9, 2021

(65) Prior Publication Data
US 2022/0253715 A1 Aug. 11, 2022

(51) Int. Cl.
| | | |
|---|---|---|
| *G06N 3/088* | (2023.01) | |
| *G06N 3/045* | (2023.01) | |
| *G06V 10/82* | (2022.01) | |

(52) U.S. Cl.
CPC ............ *G06N 3/088* (2013.01); *G06N 3/045* (2023.01); *G06V 10/82* (2022.01)

(58) Field of Classification Search
CPC .......... G06N 3/088; G06N 3/045; G06N 7/01; G06N 3/044; G06N 3/047; G06F 16/7844; G06F 40/30; G06V 10/454; G06V 10/74; G06V 10/774; G06V 10/82; G06V 20/44; G06V 20/46; G06V 20/62
See application file for complete search history.

(56) References Cited

U.S. PATENT DOCUMENTS

| | | |
|---|---|---|
| 5,604,855 A | 2/1997 | Crawford |
| 7,027,974 B1 | 4/2006 | Busch et al. |
| 8,094,881 B2 | 1/2012 | Matsugu et al. |
| 8,824,861 B2 | 9/2014 | Gentile et al. |
| 9,106,812 B1 | 8/2015 | Price et al. |
| 10,339,922 B2 | 7/2019 | Kotri et al. |

(Continued)

FOREIGN PATENT DOCUMENTS

| | | |
|---|---|---|
| EP | 3012776 A1 | 4/2016 |
| WO | WO0150668 | 7/2001 |

(Continued)

OTHER PUBLICATIONS

International Search Report and Written Opinion for PCT/US2022/015500, mailed May 16, 2022, 10 pages.

(Continued)

*Primary Examiner* — James D. Rutten
(74) *Attorney, Agent, or Firm* — Cozen O'Connor

(57) ABSTRACT

Processor-based systems and/or methods of operation may generate queries and suggest legacy narrative content (e.g., video content, script content) for a narrative under development. An artificial neural network (ANN, e.g., autoencoder) is trained on pairs of video and text vectors to capture attributes or nuances beyond those typical of keyword searching. Query vector representations generated using an instance of the ANN may be matched against candidate vector representations, for instance generated using an instance of the ANN from legacy narratives. Such may query for missing video and/or text for a narrative under development. Matches may be returned, including scores or ranks. Feature vectors may be shared without jeopardizing source narrative content. Legacy source narrative content may remain secure behind a controlling entity's network security wall.

30 Claims, 9 Drawing Sheets

(56) References Cited

U.S. PATENT DOCUMENTS

| | | | |
|---|---|---|---|
| 10,503,775 B1* | 12/2019 | Ranzinger | G06F 16/5854 |
| 10,558,761 B2* | 2/2020 | Li | G06V 10/454 |
| 10,789,288 B1 | 9/2020 | Ranzinger | |
| 2005/0081159 A1 | 4/2005 | Gupta et al. | |
| 2008/0221892 A1 | 9/2008 | Nathan et al. | |
| 2009/0024963 A1 | 1/2009 | Lindley et al. | |
| 2009/0094039 A1 | 4/2009 | MacDonald et al. | |
| 2011/0135278 A1 | 6/2011 | Klappert | |
| 2012/0173980 A1 | 7/2012 | Dachs | |
| 2013/0124984 A1 | 5/2013 | Kuspa | |
| 2013/0211841 A1 | 8/2013 | Ehsani et al. | |
| 2014/0143183 A1 | 5/2014 | Sigal et al. | |
| 2015/0186771 A1 | 7/2015 | Bhatt et al. | |
| 2015/0199995 A1 | 7/2015 | Silverstein et al. | |
| 2015/0205762 A1 | 7/2015 | Kulikowska | |
| 2016/0147399 A1 | 5/2016 | Berajawala et al. | |
| 2017/0039883 A1 | 2/2017 | Hunt et al. | |
| 2017/0078621 A1 | 3/2017 | Sahay et al. | |
| 2017/0357720 A1* | 12/2017 | Torabi | G06F 16/7844 |
| 2018/0121798 A1* | 5/2018 | Barkan | G06F 16/00 |
| 2018/0136828 A1 | 5/2018 | Threewits | |
| 2019/0213253 A1 | 7/2019 | Ray et al. | |
| 2019/0287217 A1* | 9/2019 | Cooke | G06N 3/045 |
| 2020/0125600 A1* | 4/2020 | Jo | G06F 16/784 |
| 2020/0272695 A1 | 8/2020 | Dogan et al. | |
| 2022/0161816 A1* | 5/2022 | Gyllenhammar | G06V 20/56 |
| 2023/0188319 A1* | 6/2023 | Froelicher | G06N 3/08 713/189 |
| 2023/0196769 A1* | 6/2023 | Trott | G06Q 30/0282 382/224 |

FOREIGN PATENT DOCUMENTS

| | | |
|---|---|---|
| WO | 2010081225 A1 | 7/2010 |
| WO | 2019140120 A1 | 7/2019 |
| WO | 2019140129 A1 | 7/2019 |

OTHER PUBLICATIONS

Pelin, Dogan et al., Label-Based Automatic Alignment of Video with Narrative Sentences, Computer Vision—ECCV 2016 Workshops, Sep. 18, 2016, 36 pages.

International Search Report and Written Opinion for PCT/US2019/013095, mailed Jun. 5, 2019, 15 pages.

International Search Report and Written Opinion for PCT/US2019/013105, mailed May 2, 2019, 14 pages.

Lopez, M., "Netflix's New App Aims to Simplify the Film Production Process," Videoink, URL= https://www.thevideoink.com/2018/03/07/netflixs-new-app-aims-simplify-film-production-process/, Mar. 7, 2018, 1 page.

Roettgers, J. "Netflix's Newest App Isn't for Consumers, but the People Making Its Shows," Variety, URL = http://variety.com/2018/digital/news/netflix-move-app-production-technology-1202720581/, Mar. 7, 2018, 3 pages.

Olah, Christopher, "Understanding LSTM Networks", http://colah.github.io/posts/2015-08-Understanding-LSTMs/, Aug. 28, 2015, 15 pages.

Si, Mei, et al., Si et al., "Thespian: Using Multi-Agent Fitting to Craft Interactive Drama," AMAS '05, copyright 2005 ACM, p. 21-28. (Year: 2005).

Tsai, Chia-Ming, et al., Tsai et al., "Scene-Based Movie Summarization Via Role-Community Networks" IEEE Transactions on Circuits and Systems for Video Technology, vol. 23, No. 11, Nov. 2013, p. 1927-1940 (Year 2013).

EP Search Report maiied Feb. 5, 2025 in App. No. 22753183.7-1203 / 4292021 PCT/US2022015500, 8 pages.

Michael Wray et al: "Fine-Grained Action Retrieval Through Multiple Parts-of-Speech Embeddings", arxiv.org, Cornell University Library, 201 Olin Library Cornell University Ithaca, NY 14853, Aug. 9, 2019 (Aug. 9, 2019), XP081458958.

Mithun Niluthpol Chowdhury et al: "Learning Joint Embedding with Multimodal Cues for Cross-Modal Video-Text, Retrieval",Proceedings of the 14th ACM Web Science Conference 2022, ACMPUB27, New York, NY, USA, Jun. 5, 2018 (Jun. 5, 2018), pp. 19-27.

\* cited by examiner

| PUBLIC VIDEO LIBRARY + PRIVATE LIBRARY VIDEO CLIP | ANNOTATION BY HUMAN OR MACHINE | SCRIPT |
|---|---|---|
| 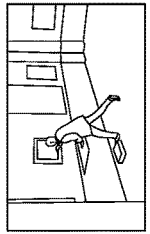 | THOMAS STEALS A MONET FROM THE MUSEUM AND LEAVES UNDETECTED. | ALL RIGHT. IT WOULD BE ONE OF THE HOTTEST DAYS OF THE YEAR. CAN YOU BELIEVE IT'S NEARLY OCTOBER? |
| 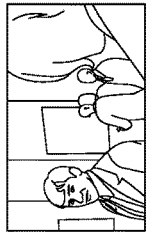 | DETECTIVE MICHAEL McCANN IS LESS THEN ENTHUSED TO HAVE CATHERINE BANNING ON THE ART THEFT CASE. | -WHY DON'T YOU BRING THE KIDS? -ARE YOU KIDDING? YOU KNOW HOW SHE IS. SHE PROBABLY RUN TO COURT SAYING I WAS ENDANGERING THEM. YOU'RE NOT KIDDING? |
|  | THOMAS AND CATHARINE MEET EACH OTHER FOR THE FIRST TIME AND SHE IS STRAIGHTFORWARD ABOUT HER OBJECTIVES. | YOU WOULDN'T BELIEVE THE SHIT THE WOMAN DEALS OUT. THE WHOLE AIR-CONDITIONING PLANT'S CRAPPED OUT. WHY DIDN'T THEY CALL MAINTENANCE? -SEE YOU IN THE MORNING. |
|  | THOMAS AND CATHARINE GET TO KNOW EACH OTHER OVER DINNER AND THOMAS REALIZES HE'S MET HIS MATCH. | -FOUND YOUR BRIEFCASE, I SEE. -EVIDENTLY. -GOOD NIGHT, SIR. THAT'S GOOD. HERE YOU GO. THANKS. |
|  | TO SHOW HER DISTRUST OF THOMAS CROWN, CATHARINE BURNS A SUPPOSEDLY PRICELESS PAINTING. | THEY WANT TO TALK TO YOU UPSTAIRS. ME, OR THE REGULAR PROCTOR? BECAUSE McKINLEY'LL BE BACK IN A COUPLE SECOND. I THINK YOU SHOULD TALK TO THEM |

FIG. 2

NARRATIVE-BASED CONTENT DISCOVERY EMPLOYING ARTIFICIAL INTELLIGENCE

BACKGROUND

Field

This disclosure generally relates to artificial intelligence, and particularly, to artificial intelligence systems and methods to facilitate narrative-based content discovery and/or generation using trained neural networks (e.g., trained autoencoders), for example narrative-based content discovery across a distributed set of content source repositories.

Description of the Related Art

Content creators and others, for example studios or other content owners or distributors, often have large content libraries of legacy narratives. These content libraries typically contain collections of content in the form of narratives, for example movies or films, television shows or series, web series, special features, video game, or interactive game, virtual reality media, augmented reality media, or even advertisements. The legacy narratives often takes the form of video (i.e., a series of images and associated sound), and corresponding text (e.g., a corresponding script).

Often these content libraries are under-utilized, for example failing to generate significant or even any income for the content owners. One reason for the failure to successfully monetize content libraries of legacy narratives is the difficultly of identifying suitable legacy narrative content by those who would otherwise use the legacy narrative content if discoverable. Existing approaches typically employ keyword-based searching in an attempt to discover legacy narrative content that meets some desired criteria. It has been found that keyword-based searching is not very robust, having limited ability to specify all of the attributes or nuances of legacy narratives that are desired and thus tends to be very inefficient at discovering suitable legacy narrative content.

It has also been observed that strong concerns exist regarding protection of copyrighted material, particularly source narrative content (e.g., narrative content in high resolution form). This typically means that the owners or distributors of the source narrative content typically retain the content libraries securely, for example behind network security walls. Only limited access may be provided, for example, via keyword-based searching, at least until a licensing agreement for access to the source narrative content is complete.

BRIEF SUMMARY

As noted above, keyword-based searching is not very robust, and is typically incapable of representing various attributes or capturing the nuance of a narrative or portions thereof. Systems and methods are described herein that improve the operation of processor-based systems, allowing enhanced discoverability of narrative content, using specifically trained artificial neural networks to generate vector representations that robustly capture attributes and nuances of narratives.

Also as noted above, concern over protecting source narrative content typically means that the content owners will not allow source narrative content to be loaded to a centralized server for analysis or content discovery. Systems and methods are described herein that improve operation of processor-based systems, allowing robust discovery of narrative content that resides secure behind network security walls, or alternatively allows vector representations of such narratives to be shared while the source narrative content that resides secure behind network security walls.

In summary, in at least some implementations, a processor-based system and/or method of operation of a processor-based system may generate and suggest legacy narrative content (e.g., video content, script content) for a narrative under development advantageously taking into account the scenes, characters, interactions, story arcs, and other aspects of both the narrative under development and the legacy narratives, and for example providing a score or ranking of the discovered or suggested legacy narratives.

In summary, in at least some implementations, a processor-based system or components thereof trains an autoencoder using narratives, in particular employing a pair of aligned vectors for each narrative in a corpus of narrative content used for training, each pair of aligned vectors including a video vector and a corresponding text vector. Such advantageously allows the capture of aspects or attributes of narratives that are not typically captured by typical keyword representations (e.g., narrative arc), in addition to the capture of aspects that would typically be captured by keyword representations.

In summary, in at least some implementations, a processor-based system or components thereof employs an autoencoder to generate queries in the form of query vector representations. Queries may take a variety of forms, for example a query to find at least an approximate match in a library of legacy narratives for missing video content or missing text content for a scene in a narrative that is under development. For instance, a scene in a narrative that is under development may be missing video content or script content. A scene in a legacy narrative may be discovered which discovered scene may supply or provide a basis for the missing video or script content, taking into account aspects of the narrative that are not typically represented or captured via key-word searching.

In summary, in at least some implementations, a processor-based system or components thereof employs an autoencoder to generate representations of legacy narratives in the form of candidate vector representations. Such may advantageously be employed to produce responses to queries, for example responses which include a set of legacy narratives or scenes from legacy narratives that at least partially satisfy a query, for instance with an associated ranking representing how well each response matches the query. Such may additionally allow robust representations of legacy narrative content to securely be shared outside a network security wall of an entity without placing the actual legacy narrative content at risk of duplication or pirating.

In summary, in at least some implementations, in an inference operation or phase, legacy narrative content can be discovered from a library of legacy narratives, where the discovered legacy narrative content best matches a part of a narrative under development. Candidate vector representations can be locally extracted from a library of legacy narratives locally, which candidate vector representations are used for inference. Query vector representations may be generated from incomplete narratives under development, remotely from the library of legacy narrative. In at least some implementations, there is no need to transfer the source legacy narrative content to a central location for processing and/or discovery (matching). Alternatively, vector representations of legacy narratives, either as candidate vectors or in raw feature vector form, may be transferred where the source legacy narrative content is not reproducible from the vector representations.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

FIG. 2 a schematic diagram of a set of training material used to train the artificial neural network (FIG. 1), according to at least one illustrated implementation.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computing systems including client and server computing systems, neural networks, machine learning, as well as networks, including various types of telecommunications networks, have not been shown or described in detail to avoid unnecessarily obscuring descriptions of the embodiments.

Unless the context requires otherwise, throughout the specification and claims which follow, the word "comprise" and variations thereof, such as "comprises" and "comprising," are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Figure 1:
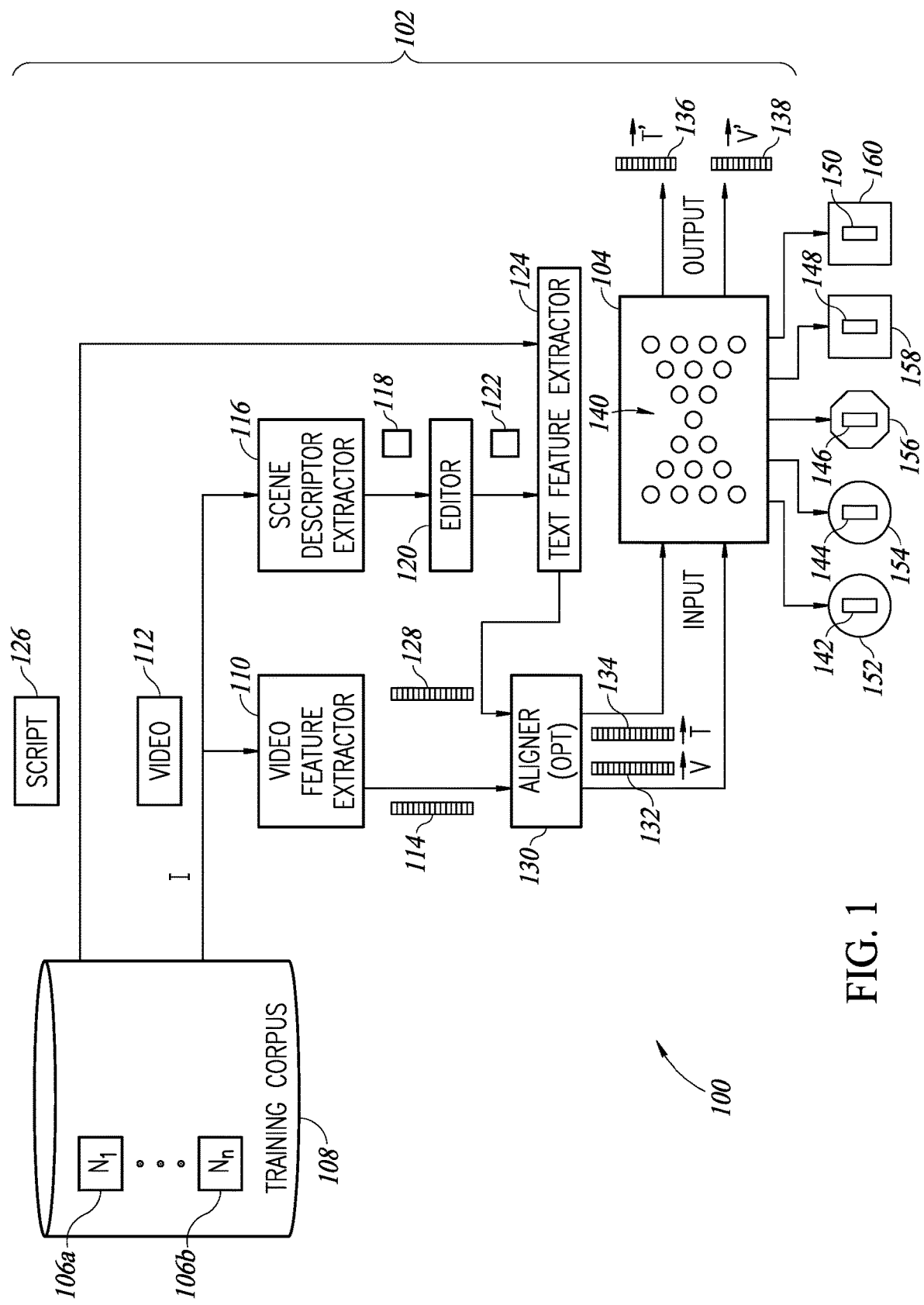
FIG. 1 is a block diagram of a media production environment, in which systems, devices and methods for automated script generation and media production may be a part, or in which they may be implemented, according to one illustrated embodiment.

FIG. 1 is a block diagram of a processor-based system for narrative content discovery and/or narrative content generation 100 (i.e., processor-based system 100), according to one illustrated embodiment. Shown are blocks representing various systems and operations of the processor-based system 100.

The processor-based system 100 includes a training system 102 that trains an artificial neural network 104 using narrative content 106a-106n. In particular, the training system 102 advantageously trains the artificial neural network 104 to capture attributes and nuances of narratives, for example story arcs thereof and/or story arcs of portions of narratives, that are not typically represented via keyword-based searching, in addition to attributes that are typically represented via keyword-based searching. Such allows more robust narrative content discovery, providing a substantial improvement over keyword-based content discovery.

As illustrated, the training system 102 may include or otherwise access a training corpus of narrative content 108. The training corpus of narrative content 108 includes a plurality of works of narrative content 106a-106n, for example movies or films, television shows, special productions (e.g., recorded plays, recorded awards shows, recorded "live events" or reality shows), and/or interactive games. The narrative content 106a-106n may include video content (e.g., a series of images and associated sound) and corresponding text content (e.g., scripts). The training corpus of narrative convent 108 may store narrative content 106a-106n that is in the public domain and/or narrative content 106a-106n that is privately held. Preferably, the narrative content 106a-106n of the training corpus 108 comprises full content of an entire narrative, for instance without any scenes missing. The video content may take any of one or more formats, typically a digitized format (e.g., MPEG-2), even where the original source content was in an analog form (e.g., film). The text content likewise may take any variety of formats, typically a digitized format (e.g., PDF, MS-WORD).

The processor-based system 100 may optionally include a video feature extractor 110. The video feature extractor 110 receives video 112, for each of works of narrative content 106a-106b in the training corpus or narrative content 108. The video feature extractor 110 extracts features, and generates or outputs a video feature vector 114.

The processor-based system 100 may optionally include a scene descriptor extractor 116. The scene descriptor extractor 116 receives the video content 112. The scene descriptor extractor 114 extracts scenes, and generates or outputs scene descriptors 118.

The processor-based system 100 may optionally include an editor 120 that receives the automatically extracted scene descriptions 118 allows editing of autonomously extracted scene descriptors 118 to create edited scene descriptors 122.

The processor-based system 100 may optionally include a text feature extractor 124. The text feature extractor 124 receives the edited scene descriptors 122 and the scripts 126. The text feature extractor 124 extracts text features, and generates or outputs a text feature vector 128.

The processor-based system 100 may optionally include an aligner 130 that aligns the video feature vector 114 and the text feature vector 128, to produce a pair of aligned video feature and text feature vectors 132, 134. Alternatively, the video feature extractor 110 and the text feature extractor 124 may be programmed to generate pairs of a video feature vector 114 and text feature vector 128 that are already aligned with one another.

The processor-based system 100 employs a plurality of pairs of aligned video feature and text feature vectors 132, 134 as input to train the artificial neural network 104. The artificial neural network 104 provides as output a pair of output video and text vectors 136, 138, which are used to train the artificial neural network 104 (e.g., via stochastic gradient descent). In at least some implementations, the artificial neural network 104 takes the form of an autoencoder 140, with an encode portion, a decode portion and a code portion between the encode portion and the decode portion. The artificial neural network 104 and/or autoencoder 140 trained using the plurality of pairs of aligned video feature and text feature vectors 132, 134 as input are referred to herein as video and text trained artificial neural network 104 and video and text trained autoencoder 140, in order to distinguish such from other instances or artificial neural networks and/or autoencoders which may, for example, be employed to autonomously extract features and/or generate video and/or text feature vectors that are, for instance used as input for training.

In at least some implementations, the processor-based system 100 may provide a video and text trained artificial neural network (e.g., video and text trained autoencoder 140) to one or more processor-based systems 142, 144, 146, 148, 150 operated by any one or more of a number of distinct entities 152, 154, 156, 158, 160, as described herein. For example, the processor-based system 100 may provide a video and text trained autoencoder 140 to the processor-based systems 148, 150 of one or more legacy content owners or legacy content distributors 158, 160 who maintain a library of legacy narrative content behind a network security wall. Additionally, the processor-based system 100 may provide the video and text trained autoencoder 140 to the processor-based systems 142, 144 of one or more content developer entities 152, 154, who would potentially like to access legacy narrative content, for example to facilitate development of new narratives. Additionally or alternatively, the processor-based system 100 may provide the video and text trained autoencoder 140 to a processor-based system 146 of an intermediary entity 156 that operates between the content developer(s) 152, 154 and the legacy content owner(s) or legacy content distributor(s) 158, 160. In some implementations, the training system 102 may be operated by the intermediary entity 156 and the video and text trained autoencoder 140 retained exclusively on the processor-based system 146 of the intermediary entity 156.

While a distinction is made between the content developer and the legacy content owner or legacy content distributor, such a distinct is simply made to facilitate description of the operation of the processor-based system 100. One of ordinary skill in the art would understand that a content developer may itself own or control distribution of its own legacy narrative content. Likewise, a legacy content owner or legacy content distributor may at any time develop new narrative content. Thus, the use of the terms content developer, legacy content owner or legacy content distributor are not intended to be limiting, and as such the entities may be referred to a first, second or even third entity without being limited to whether a given entity is developing narrative content or providing discovery to its legacy narrative content.

FIG. 2 shows a set of training material 200 used to train the artificial neural network 104 (FIG. 1), according to at least one illustrated implementation.

As illustrated, the set of training material 200 includes videos 202 for each narrative. The videos 202 may come from a public video library, private video library, and/or from a collection of video clips. As previously noted, the videos 202 may constitute a sequence of images with associated sound (e.g., human voice, music, background sounds), and typically represent the entire narrative. The videos 202 may be stored in any of a large variety of formats, typically in a digital form.

Also as illustrated, the set of training material 200 includes text descriptions 204 for each narrative, for example textual descriptions of each scene in the corresponding narrative. The text descriptions 204 may provide a short description of the content, narrative arc, meaning, events and/or characters summarizing each scene of the narrative. The text descriptions 204 may constitute annotations autonomously generated by a processor, manually generated by a human, or autonomously generated by a processor and manually modified by a human.

As further illustrated, the set of training material 200 includes a script 206 for each narrative. The scripts 206 typically include character dialog and staging instructions or cues.

Figure 3:
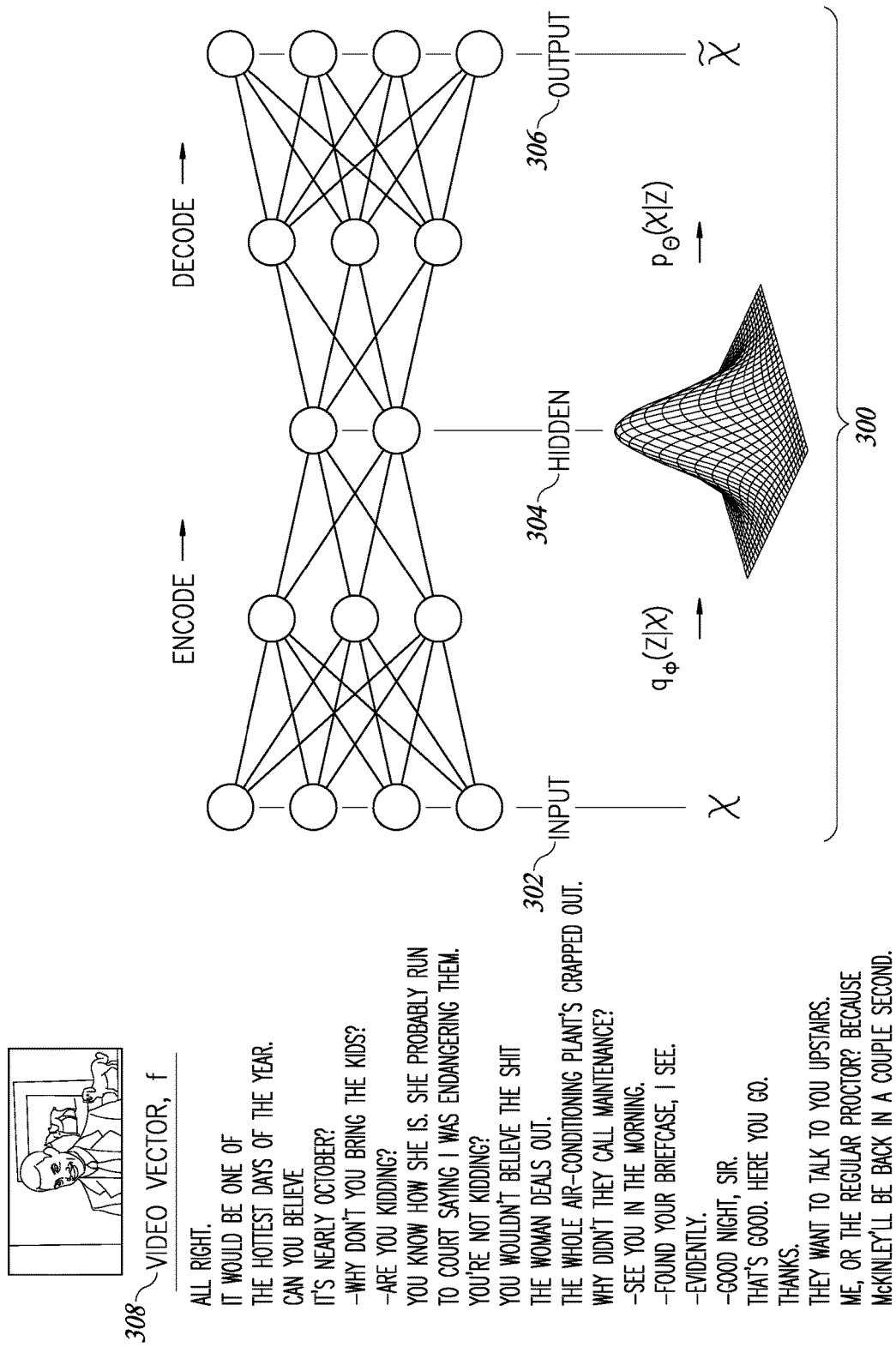
FIG. 3 is a graphical representation of an artificial neural network that is an autoencoder for processing a sample script in the system for automated script generation and media production, according to one illustrated embodiment.

FIG. 3 is a graphical representation of an artificial neural network 100 (FIG. 1) that takes the form of an autoencoder 300 for use as part of the processor-based system 100 (FIG. 1), according to one illustrated implementation.

In at least some implementations, the processor-based system 100 or components thereof trains the autoencoder 300 using narratives, in particular employing a pair of vectors for each narrative in a corpus of narrative content 108 (Figure) used for training, each pair of vectors including a video vector and a corresponding text vector. Such advantageously allows the video and text trained autoencoder to capture of aspects of narratives that are not typically captured by typical keyword representations (e.g., narrative arc), in addition to the capture of aspects that would typically be captured by keyword representations.

In at least some implementations, the processor-based system 100 or components thereof employs the video and text trained autoencoder 300 to generate queries in the form of vector representations (i.e., query vector representations). Queries may take a variety of forms, for example a query to find a match in a library of legacy narratives for missing video content or missing text content for a scene in a narrative that is under development.

In at least some implementations, the processor-based system 100 or components thereof employs the video and text trained autoencoder 300 to generate representations of legacy narratives in the form of vector representations (i.e., candidate vector representations). Such may advantageously be employed to produce responses to queries, for example responses which include a set of legacy narratives or scenes from legacy narratives that satisfy a query, for instance with an associated score or ranking representing how well each response matches the query. Such may also allow robust representations of legacy narratives to be securely shared outside a network security wall of an entity without placing the actual legacy narrative content at risk of duplication or pirating.

The video and text trained autoencoder 300 is used for learning generative models of data to generate responses to queries. Queries may be, for example, to find scenes in legacy narratives that approximately fit into a missing scene of a narrative that is under development. For instance, a scene in a narrative that is under development may be missing video content or script content. A scene in a legacy narrative may supply or provide a basis for the missing video or script content, taking into account aspects of the narrative that are not typically represented or captured via key-word searching.

In one implementation, the video and text trained autoencoder 300 may be a variational autoencoder, such that the processor-based system 100 or components thereof processes the sample script via the variational autoencoder with a set of assumptions regarding a distribution of a number of latent (unobserved, inferred) variables. As represented in FIG. 3, the variational autoencoder 300 includes an input layer 302, an output layer 306 and one or more hidden layers 304 connecting them. The output layer has the same number of nodes as the input layer and has the purpose of reconstructing its own inputs instead of predicting the target value given the inputs x. This reconstruction is represented by $\tilde{x}$.

Input may be supplied in the form of a pairs of aligned vectors, each pair of aligned vectors comprising a training video vector 308 and training text vector 310 (one of each represented in FIG. 3). The training video vector 308 comprises a plurality of video features and the training text vector 310 comprises a plurality of text features.

The variational autoencoder 300 treats its inputs, hidden representations, and reconstructed outputs as probabilistic random variables within a directed graphical model. In this manner, the encoder portion becomes a variational inference network, mapping observed inputs, represented by x, to (approximate) posterior distributions over latent space, represented by z, and the decoder portion becomes a generative network, capable of mapping arbitrary latent coordinates back to distributions over the original data space. The global encoder and decoder parameters (i.e., neural network weights and biases) are represented as $\phi$ and $\theta$, respectively. The mapping of observed inputs to (approximate) posterior distributions over latent space is represented by $q_\phi(z|x)$. The sampled $\tilde{z}$ is then passed to the decoder/generative network, which symmetrically builds back out to generate the conditional distribution over input space, represented as reconstruction $\tilde{x} \sim p_\theta(x|z)$. The joint distribution of input and latent variables is represented by $P_\theta(x,z)=\int P(z) P_\theta(x|z)$ and a marginal distribution of input variables is represented by $P_\theta(x)=\int P_\theta(x,z)dz$. Calculating the marginal distribution (above) is intractable, so the processor-based system 100 or components thereof uses a variational lower bound, represented by $\log P_\theta(x) \geq \log P_\theta(x) - KL(q_\theta(z|x)\|p_\theta(z|x))$, where KL represents the Kullback-Leibler divergence and is a measure of how one probability distribution diverges from a second, expected probability distribution. The KL-divergence is with a variational posterior $q_\theta(z|x)$. The posterior distribution is a normal distribution parameterized by, for example, an artificial deep neural network.

Figure 4:
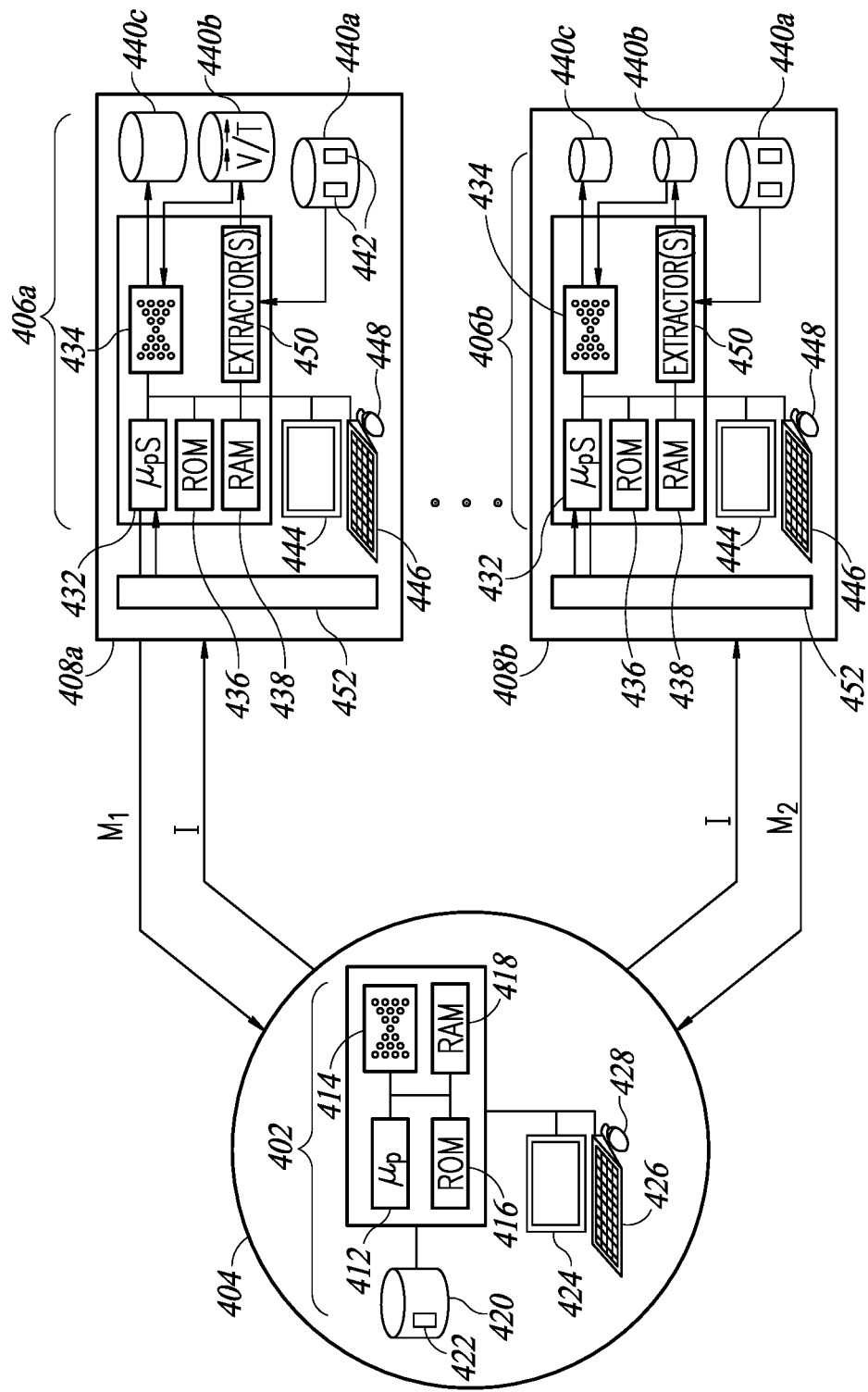
FIG. 4 is a schematic diagram of an implementation in which a processor-based system of a first entity directly queries respective processor-based systems of each of a plurality second entities using an artificial neural network, for example an autoencoder, accordingly to a least one illustrated implementation, according to one illustrated embodiment.

FIG. 4 shows an implementation in which a processor-based system 402 of a first entity 404 directly queries respective processor-based systems 406*a*, 406*b* of each of a plurality second entities 408*a*, 408*b* using a video and text trained artificial neural network, for example a video and text trained autoencoder, accordingly to a least one illustrated implementation.

The first entity 404 is typically an entity that is developing a narrative while the second entities 408*a*, 408*b* are typically entities that have libraries of legacy narrative content (e.g., existing library of movies, films, television shows). While only one first entity 404 is illustrated, in a typical implementation there will be two or more first entities, that is entities that are developing narratives and which would like to perform discovery on one or more libraries of legacy narratives. While only two second entities 408*a*, 408*b* are illustrated, in a typical implementation there will be one, two, or even more second entities, that is entities that are own or control distribution of libraries of legacy narratives and would like to expose those libraries of legacy narratives to discovery while securely maintaining the source legacy narrative content.

As previously explained, an entity developing new narratives may have its own library of legacy narratives, and likewise an entity with a library of legacy narratives may develop new narrative. Thus, the various implementations are not in any way limited to situations where narrative development and libraries of legacy narratives are exclusive to respective entities. In fact, at least some of the approaches described herein can be employed by an entity developing new narratives to query against its own library of legacy narratives, although additional advantages may be realized when one entity generates a query with respect to another entity's library of legacy narrative, for example the ability to securely expose attributes of the legacy narratives without risk of piracy.

The processor-based system 402 of the first entity 404 includes one or more processors 412, an artificial neural network in the form of a video and text trained autoencoder 414, and one or more non-transitory processor-readable media for example read only memory (ROM) 416, random access memory (RAM) 418, and non-volatile storage 420 (e.g., spinning media storage, FLASH memory, solid state drive (SSD)). The ROM 416 and RAM 418 store processor-executable instructions which, when executed by the at least one processor 412, cause the at least one processor 412 to perform one or more of the methods described herein, for example in conjunction with the video and text trained autoencoder 414. The non-volatile storage 420 may store one or more narratives 422 that are under development.

The processor-based system 402 of the first entity 404 may also include one or more user input/output devices, for example a display or monitor 424 (e.g., touch-screen display), keypad or keyboard 426, computer mouse 428, trackball or other pointer control device. The various components may be communicatively coupled to one another via one or more communications channels (e.g., communications buses, not called out). The processor-based system 402 of the first entity 404 includes one or more communications ports (e.g., wired ports, wireless ports) that allow communication with other processor-based systems, for instance via a network (e.g., Internet, Worldwide Web, extranet).

As explained herein, the processor-based system 402 of the first entity 404 may use the video and text trained autoencoder 414 to generate queries I related to one or more narratives under development. For example, the processor-based system 402 of the first entity 404 may use the video and text trained autoencoder 414 to generate a query I using the content under development, the query looking for example for a match to video or text that is missing for a scene in the narrative under development. Being trained on a substantial corpus of narratives, the video and text trained autoencoder 414 may generate a pair of aligned vectors, that is a video vector and a text vector that robustly represents at least the scene with the missing video or text in the entire context of the narrative under development, for example in the form of query vector representations. Such may be denominated as a "query" or "ideal" or "target" vector representation, for which matches will be sought. The processor-based system 402 of the first entity 404 may submit the queries I to the processor-based systems 406a, 406b of the second entities 408a, 408b, and receive responses therefrom in the form of matches $M_1$, $M_2$. The matches $M_1$, $M_2$ represent the closest matches to the query (e.g., match between vector(s) in query and vector(s) representing legacy narratives), and which typically may not completely satisfy the query and thus may not be an exact match. In fact, the matches $M_1$, $M_2$ will typically include a score or rank indicating how closely the match satisfies the query, at least with respect to other matches, for instance providing for a ranked order.

The processor-based systems 406a, 406b of the second entities 408a, 408b each includes one or more processors 432, a video and text trained autoencoder 434, and one or more non-transitory processor-readable media for example read only memory (ROM) 436, random access memory (RAM) 438, and non-volatile storage 440a, 440b, 440c (e.g., spinning media storage, FLASH memory, solid state drive (SSD)). The ROM 436 and RAM 438 store processor-executable instructions which, when executed by the at least one processor 432, cause the at least one processor 432 to perform one or more of the methods described herein, for example in conjunction with the video and text trained autoencoder 434. A first one of the non-volatile storage 440a may store a plurality of legacy narratives 442, for example in a high-resolution digital format. A second one of the non-volatile storage 440b may store paired vector representations of the plurality of legacy narratives 442, for example in the form of video vectors and text vectors that may be used as input to the video and text trained autoencoder 434. The paired vector representations of the plurality of legacy narratives 442 may be autonomously generated, for example via one or more artificial neural networks (e.g., natural language processor). A third one of the non-volatile storage 440a may store vector representations of the plurality of legacy narratives 442, for example in the form of video vectors and text vectors that are output by the video and text trained autoencoder 434. While the non-volatile storage 440a, 440b, 440c are represented as three separate storage units, in some implementations storage can be combined to one or two storage units, or distributed over more than three storage units. The processor-based systems 406a, 406b of the second entities 408a, 408b optionally include one or more extractors 450 that extract features from the source legacy narratives. For example, a video extractor may autonomously extract video features from the video of the legacy narrative, and a text extractor may autonomously extract text descriptors and/or text features from the video and/or script of the legacy narrative. The extractors may, for example, employ natural language processing (NPL) artificial intelligence or other forms of artificial intelligence or machine learning.

The processor-based systems 406a, 406b of the second entities 408a, 408b may each also include one or more user input/output devices, for example a display or monitor 444 (e.g., touch-screen display), keypad or keyboard 446, computer mouse 448, trackball or other pointer control device. The various components may be communicatively coupled to one another via one or more communications channels (e.g., communications buses, not called out). The processor-based systems 406a, 406b of the second entities 408a, 408b each includes one or more communications ports (e.g., wired ports, wireless ports) that allow communication with other processor-based systems, for instance via a network (e.g., Internet, Worldwide Web, extranet).

The processor-based systems 406a, 406b of the second entities 408a, 408b may each be protected or secured via one or more network security structures, for instance network security walls 452. The network security walls 452 secure the source legacy narratives within the confines of a network structure. The second entities 408a, 408b may provide only limited access to the source narratives, for example after completion of a licensing agreement. Even then, the access provided may be secure access, for example in an encrypted form over an secure communications channel.

As explained herein, the processor-based systems 406a, 406b of the second entities 408a, 408b may use the video and text trained autoencoder 434 to generate aligned vector pair representations of the legacy narratives. The processor-based systems 406a, 406b of the second entities 408a, 408b may perform matching between the queries and the aligned vector pair representations of the legacy narratives. For example, the processor-based systems 406a, 406b of the second entities 408a, 408b may receive a query I generated using the video and text trained autoencoder 414, and perform matching between the vector representation in the query and the vector representations of the legacy narratives, identifying matches and sores or rankings for the matches based on how closely the vector representations match. Thus, the processor-based systems 406a, 406b of the second entities 408a, 408b may provide responses $M_1$, $M_2$ to the query I including matches for video or text that is missing for a scene in the narrative under development, along with a score or rank. Being trained on a substantial corpus of narratives, the video and text trained autoencoder 434 may generate a pair of aligned vectors, that is a video vector and a text vector that robustly represents at least the scene in the entire context of the legacy narrative.

Figure 5:
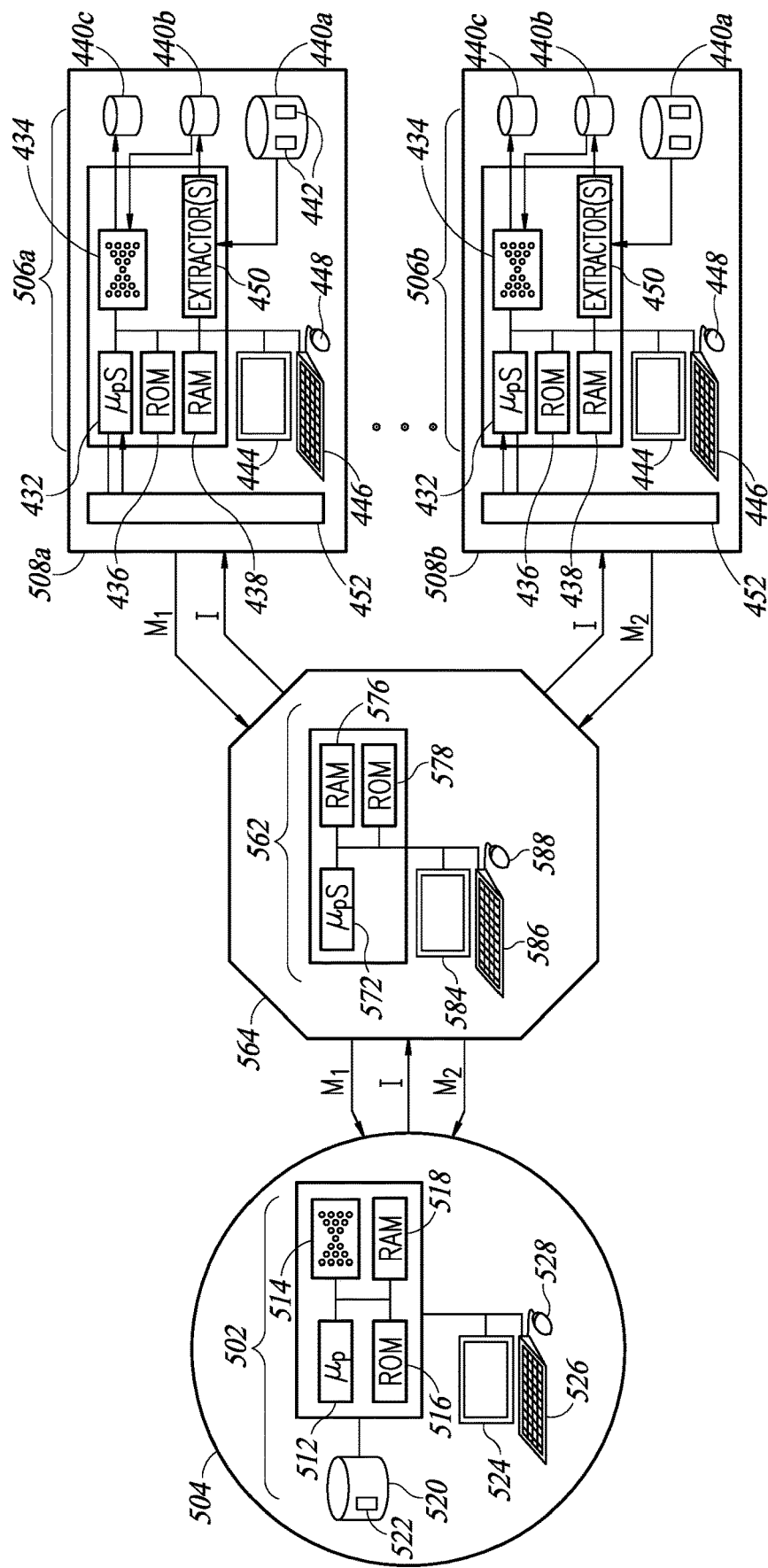
FIG. 5 is a schematic diagram of an implementation in which a processor-based system of a first entity indirectly queries respective processor-based systems of each of a plurality second entities using an artificial neural network via a processor-based system of an intermediary entity, for example an autoencoder, accordingly to a least one illustrated implementation.

FIG. 5 shows an implementation in which a processor-based system 402 of a first entity 404 indirectly queries respective processor-based systems 406a, 406b of each of a plurality second entities 408a, 408b using an artificial neural network via a processor-based system 562 of an intermediary entity 564, for example an autoencoder, accordingly to a least one illustrated implementation.

The processor-based system 402 of the first entity 404 is similar or even identical to that illustrated in and described with respect to FIG. 4 so the same reference numbers are used, and the description of the components thereof is not repeated. The processor-based systems 406a, 406b of each of the second entities 408a, 408b is similar or even identical to that illustrated in and described with respect to FIG. 4 so the same reference numbers are used, and the description of the components thereof is not repeated.

The intermediary entity 564 is typically an entity that provides services between narrative developers and those having control over libraries of legacy content. In at least some implementations, the intermediary entity 564 is the entity responsible for training and distributing the artificial neural network (e.g., autoencoder). In some implementations, the intermediary entity 564 may itself own or otherwise control a library of legacy narratives and/or develop new narratives.

Thus, the various implementations are not in any way limited to situations where narrative development and libraries of legacy narratives are exclusive to respect entities. In fact, at least some of the approaches described herein can be employed by the intermediary entity 564 querying against its own library of legacy narratives to facilitate development of new narratives by the intermediary entity, although typically the intermediary entity serves as an intermediary between a first entity that developing a new narrative and a second entity with a library of legacy narratives.

The processor-based system 562 of the intermediary entity 564 includes one or more processors 572, and one or more non-transitory processor-readable media for example read only memory (ROM) 576, random access memory (RAM) 578, and non-volatile storage 580 (e.g., spinning media storage, FLASH memory, solid state drive (SSD)). The ROM 576 and RAM 578 store processor-executable instructions which, when executed by the at least one processor 572, cause the at least one processor 572 to perform one or more of the methods described herein, for example passing inquiries generated by a processor-based system 402 of a first entity 404 to respective processor-based systems 406a, 406b of one or more second entities 408a, 408b.

The processor-based system 562 of the intermediary entity 564 may also include one or more user input/output devices, for example a display or monitor 584 (e.g., touch-screen display), keypad or keyboard 586, computer mouse 588, trackball or other pointer control device. The various components may be communicatively coupled to one another via one or more communications channels (e.g., communications buses, not called out). The processor-based system 562 of the intermediary entity 564 includes one or more communications ports (e.g., wired ports, wireless ports) that allow communication with other processor-based systems, for instance via a network (e.g., Internet, Worldwide Web, extranet).

As explained herein, the processor-based system 402 of the first entity 404 may use the video and text trained autoencoder 414 to generate queries I related to one or more narratives under development. For example, the processor-based system 402 of the first entity 404 may use the video and text trained autoencoder 414 to generate a query I using the content under development, the query looking for example for a match to video or text that is missing for a scene in the narrative under development. Being trained on a substantial corpus of narratives, the video and text trained autoencoder 414 may generate a pair of aligned vectors, that is a video vector and a text vector that robustly represents at least the scene with the missing video or text in the entire context of the narrative under development, for example in the form of query vector representations. Such may be denominated as a "query" or "ideal" or "target" vector representation, for which matches will be sought. The processor-based system 402 of the first entity 404 may submit the queries I to the processor-based system 506 of the intermediary entity 508. The processor-based system 506 of the intermediary entity 508 may forward or otherwise transmit the queries I, either unmodified or modified, to the processor-based systems 406a, 406b of the second entities 408a, 408b. The processor-based system 506 of the intermediary entity 508 may receive responses from one or more of the processor-based systems 406a, 406b of the second entities 408a, 408b in the form of matches $M_1$, $M_2$. The processor-based system 506 of the intermediary entity 508 may forward or otherwise transmit the matches $M_1$, $M_2$, either unmodified or modified, to the processor-based system 402 of the first entity 404. The matches $M_1$, $M_2$ represent the closest matches to the query, and which typically may not completely satisfy the query and thus may not be an exact match. In fact, the matches $M_1$, $M_2$ will typically include a score or rank indicating how closely the match satisfies the query, at least with respect to other matches, for instance providing for a ranked order.

Figure 6:
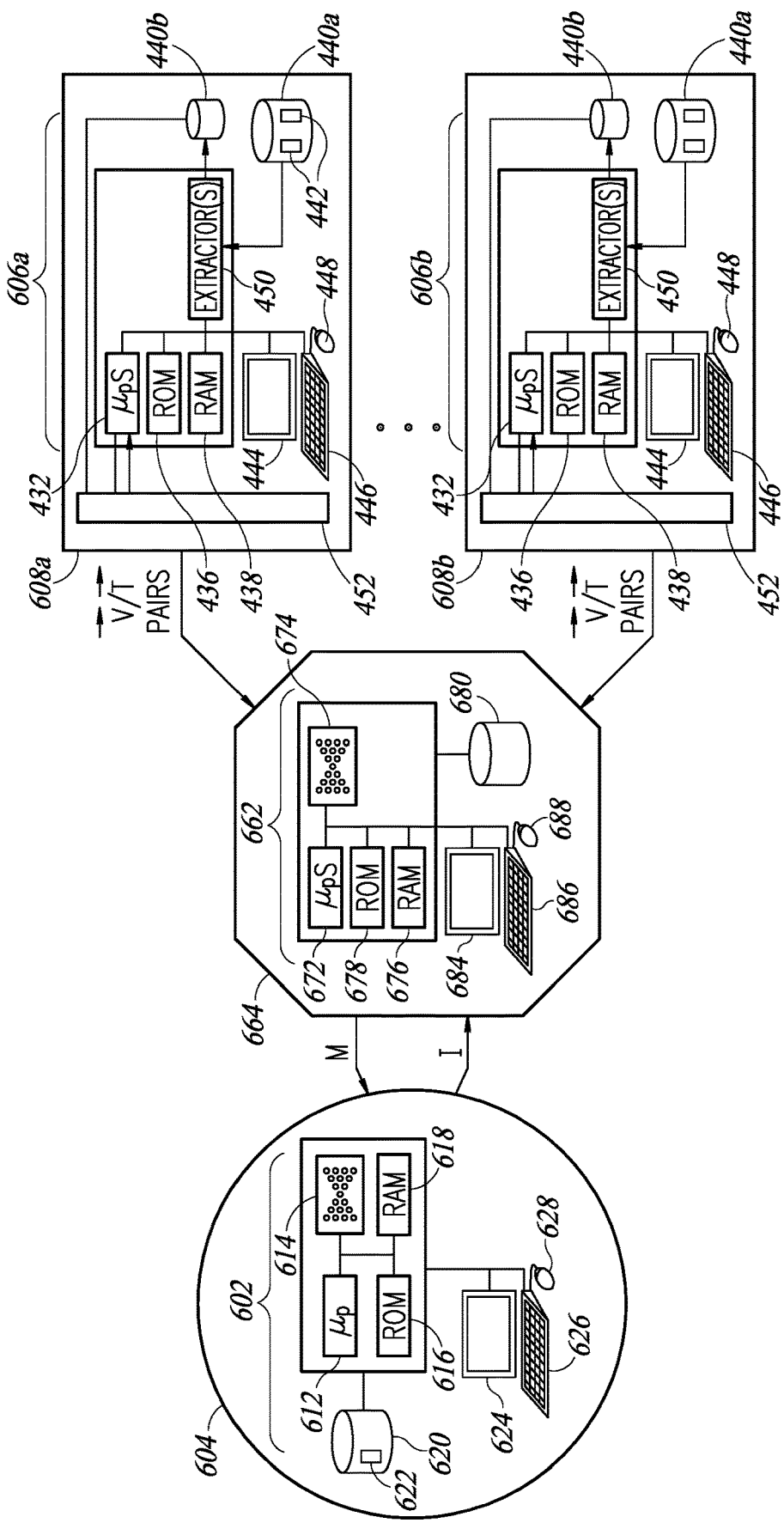
FIG. 6 is a schematic diagram of an implementation in which a processor-based system of a first entity generates queries I, respective processor-based systems of each of a plurality second entities provide vector representations of narratives in their respective libraries of legacy narratives to a processor-based system of an intermediary entity, and the processor-based system of the intermediary entity generates vector representations of the legacy narratives using an artificial neural network, for example an autoencoder, receives and processes the queries, and provides results to the queries to the processor-based system of the first entity, accordingly to a least one illustrated implementation.

FIG. 6 shows an implementation in which a processor-based system 402 of a first entity 404 generates queries I, respective processor-based systems 606a, 606b of each of a plurality second entities 608a, 608b provide vector representations of narratives in their respective libraries of legacy narratives to a processor-based system 662 of an intermediary entity 664, and the processor-based system 602 of the intermediary entity 664 generates vector representations of the legacy narratives using an artificial neural network, for example an autoencoder, receives and processes the queries, and provides results to the queries to the processor-based system 402 of the first entity 404, accordingly to a least one illustrated implementation.

The processor-based system 402 of the first entity 404 is similar or even identical to that illustrated in and described with respect to FIG. 4 so the same reference numbers are used, and the description of the components thereof is not repeated. The processor-based systems 606a, 606b of each of the second entities 608a, 608b is similar to that illustrated in and described with respect to FIG. 4, although the video and text vectors are not processed at the processor-based systems 606a, 606b by a video and text vector trained autoencoder, nor do the processor-based systems 606a, 606b perform matching, but rather the video and text feature vectors are provided in a "raw" form to the processor-based system 662 of the intermediary entity 664 which employs a video and text trained autoencoder and performs the matching.

Notably, the video and text feature vectors even in the "raw" (i.e., features vectors not yet processed by the video and text trained autoencoder, but possibly processed via other artificial neural networks or machine learning techniques or structures) are in a form that protects the underlying narratives (e.g., legacy narratives, narratives under development). Thus, the "raw" video and text feature vectors can be safely shared outside of any network security walls, although even then the communications channels may be encrypted or otherwise secured.

The processor-based system 662 of the intermediary entity 664 includes one or more processors 672, video and text trained artificial neural network (e.g., video and text trained autoencoder 674), and one or more non-transitory processor-readable media for example read only memory (ROM) 676, random access memory (RAM) 678, and non-volatile storage 680 (e.g., spinning media storage, FLASH memory, solid state drive (SSD)). The ROM 676 and RAM 678 store processor-executable instructions which, when executed by the at least one processor 672, cause the at least one processor 672 to perform one or more of the methods described herein, for example passing inquiries generated by a processor-based system 402 of a first entity 404 to respective processor-based systems 606a, 606b of one or more second entities 608a, 608b.

The processor-based system 662 of the intermediary entity 664 may also include one or more user input/output devices, for example a display or monitor 624 (e.g., touch-screen display), keypad or keyboard 526, computer mouse 628, trackball or other pointer control device. The various components may be communicatively coupled to one another via one or more communications channels (e.g., communications buses, not called out). The processor-based system 662 of the intermediary entity 664 includes one or more communications ports (e.g., wired ports, wireless ports) that allow communication with other processor-based systems, for instance via a network (e.g., Internet, World-wide Web, extranet).

As explained herein, the processor-based system 402 of the first entity 404 may use the video and text trained autoencoder 414 to generate queries I related to one or more narratives under development. For example, the processor-based system 402 of the first entity 404 may use the video and text trained autoencoder 414 to generate a query I using the content under development, the query looking for example for a match to video or text that is missing for a scene in the narrative under development. Being trained on a substantial corpus of narratives, the video and text trained autoencoder 414 may generate a pair of aligned vectors, that is a video vector and a text vector that robustly represents at least the scene with the missing video or text in the entire context of the narrative under development, for example in the form of query vector representations. Such may be denominated as a "query" or "ideal" or "target" vector representation, for which matches will be sought. The processor-based system 402 of the first entity 404 may submit the queries I to the processor-based system 662 of the intermediary entity 664.

The processor-based system 662 of the intermediary entity 664 may also receive video and text feature vectors (e.g., raw) from one or more the processor-based systems 606a, 606b of the second entities 608a, 608b. The processor-based system 506 of the intermediary entity 508 may process the received video and text feature vectors (e.g., raw) via a video and text trained artificial neural network (e.g., video and text trained autoencoder 674). The processor-based system 662 of the intermediary entity 664 may preform matching for the video and text vectors received from the first processor-based system 402 of the first entity 404 with respect to the various pairs of video and text vectors generated via the video and text trained autoencoder 674. The processor-based system 662 of the intermediary entity 664 may forward or otherwise transmit the matches $M_1$, $M_2$ to the processor-based system 402 of the first entity 404. The matches $M_1$, $M_2$ represent the closest matches to the query, and which typically may not completely satisfy the query and thus may not be an exact match. In fact, the matches $M_1$, $M_2$ will typically include a score or rank indicating how closely the match satisfies the query, at least with respect to other matches, for instance providing for a ranked order.

Figure 7:
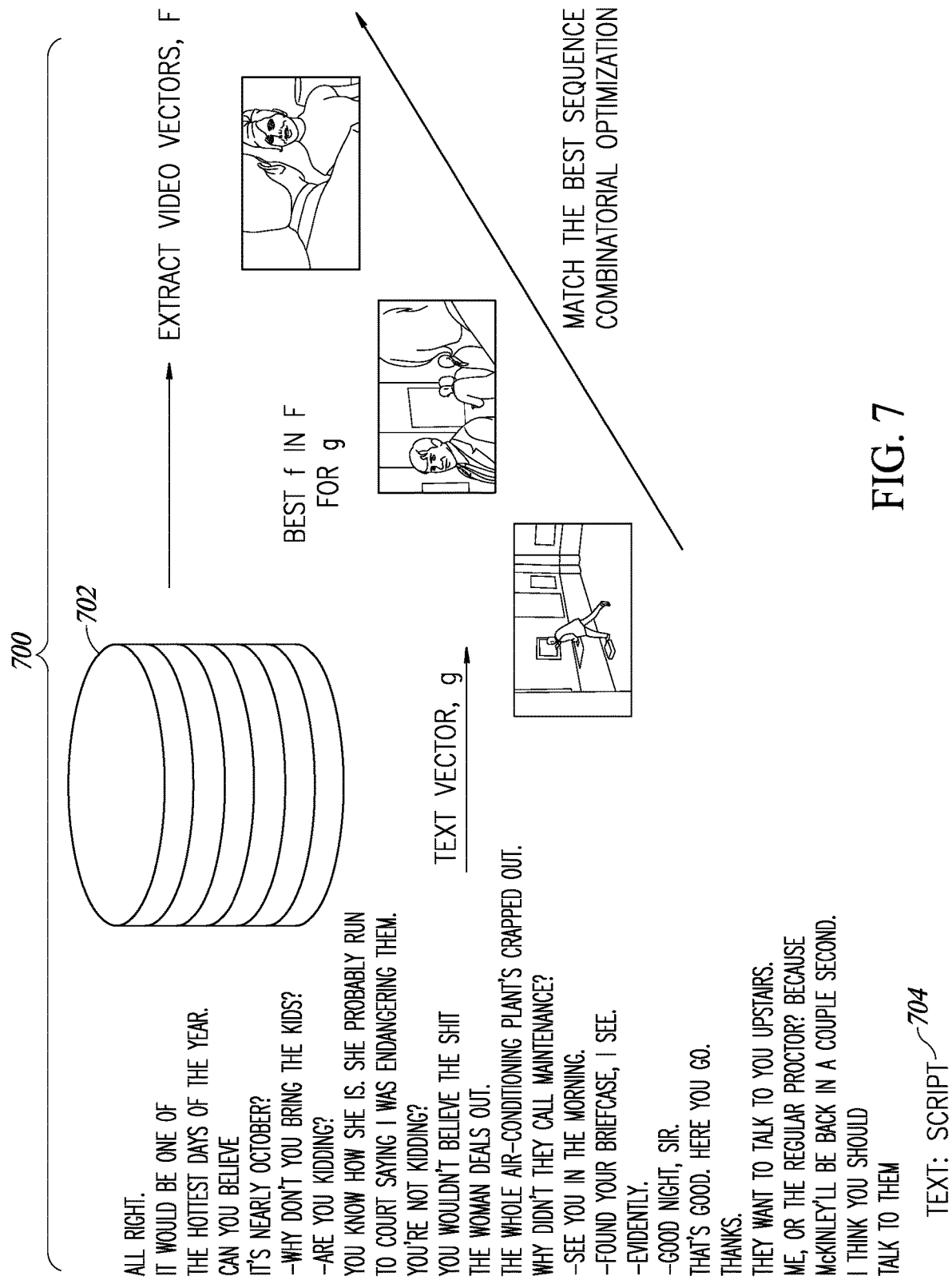
FIG. 7 is a schematic representation of operation of a processor-based system to perform inference, according to at least one illustrated implementation.

FIG. 7 is a schematic representation of operation 700 of a processor-based system to perform inference, according to at least one illustrated implementation.

The inference process includes providing a video (e.g., video files) 702, for example a video from a narrative under development. A video feature vector is extracted from the video, for example via an extractor. The trained autoencoder model is queried to using the video feature vector to find the most probable text sequence that describes the content of the video.

Alternatively, a script or a text description 704 is provided along with a sequence of videos (e.g., video files) with a missing video, for example a video from a narrative under development. A text feature vector is extracted from text and a video feature vector is extracted from the video, for example via one or more extractors. When a query is made to find the best matching video vector, the inference engine searches across the dataset of all candidate video vectors to find the one that maximizes log P_{best} (i.e., best match with video sequences). Here log P_{max} is the video vector that has the highest probability from the output of the trained autoencoder for the matching text description. And log P_{max} (best match with video sequences) is the video vector that has the highest match (i.e., minimum Euclidean distance) from the other videos in the sequence.

Figure 8:
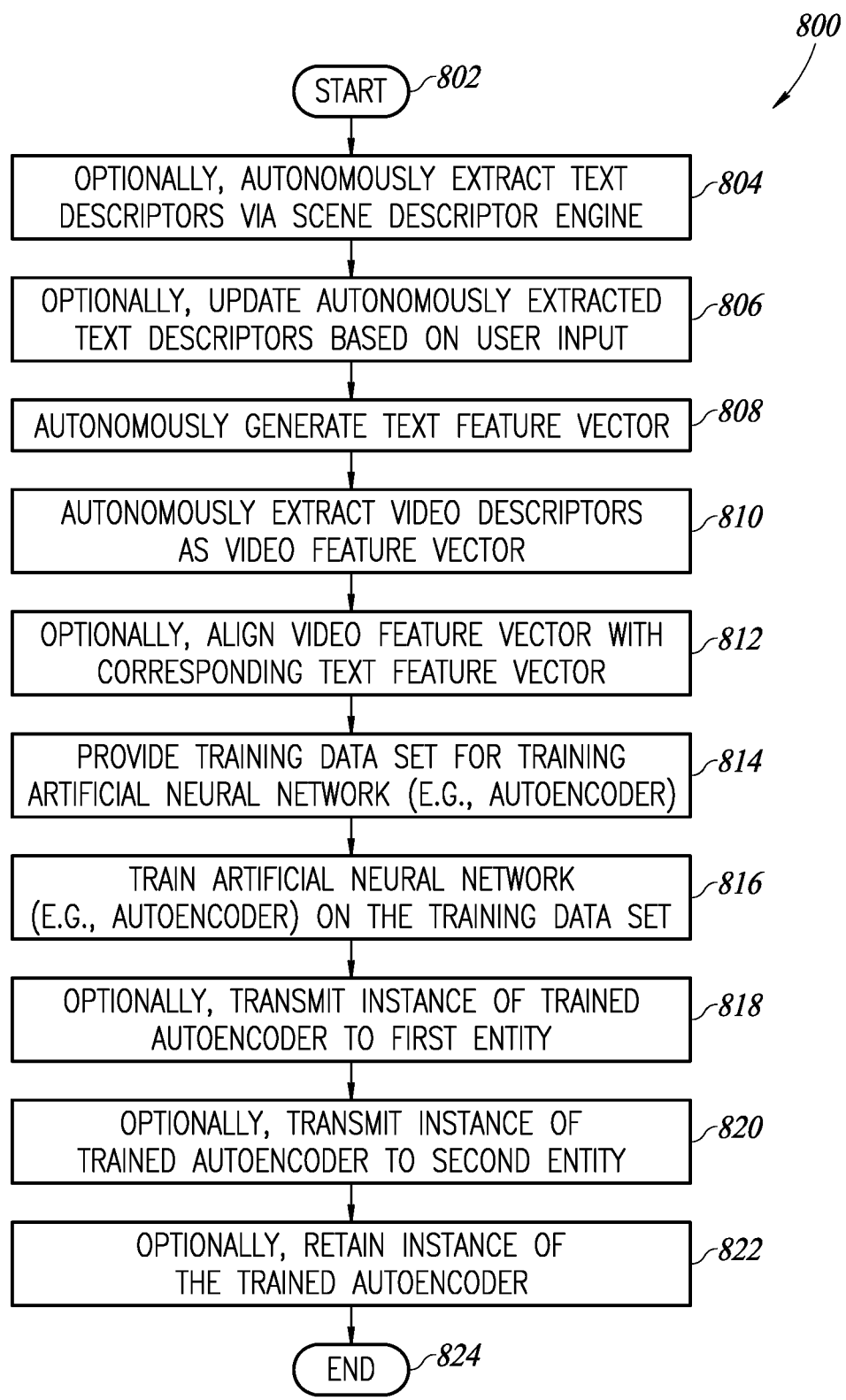
FIG. 8 is a flow diagram showing a method to perform mapping of a narrative of a script to a graph, according to one illustrated embodiment.

FIG. 8 shows a method 800 of operation in a processor-based system, according to at least illustrated implementation.

The method 800 starts at 802, for example in response to powering on of the processor-based system, receipt of a command, or invocation from a calling routine.

Optionally at 804, an extractor autonomously extracts one or more of text descriptors via a scene descriptor engine for narrative(s). The extractor may, for example include a natural language processor trained using supervised or unsupervised learning, for example, trained on an annotated data set to produce a set of scene descriptors and/or text feature vectors, which may represent a number of scenes.

Optionally at 806, an editor updates one or more of autonomously extracted text descriptors, for example based on user input. For example, an editor may allow a user to enter input via a keyboard, mouse or touch sensitive display, to adjust or modify one or more autonomously generated text descriptors.

At 808, a text features extractor extracts one or more text features. The text features may, for example, be extracted as a text features vector for a narrative or portion thereof. The text features extractor may extract the text features from a script of the narrative and from the text descriptors. While the text features extractor may employ artificial intelligence, including for instance an artificial neural network, at this point the text feature vector is considered "raw" in that it has not been processed via a video and text feature vector trained artificial network.

Optionally at 810, a video features extractor autonomously extracts one or more video features. The video features may, for example, be extracted as a video features vector representation for a respective narrative or portion thereof. While the video features extractor may employ artificial intelligence, including for instance an artificial neural network, at this point the video feature vector is considered "raw" in that it has not been processed via a video and text feature vector trained artificial network.

Optionally at 812, an aligner aligns the video features vector with a corresponding text features vector for a narrative or portion thereof. Alternatively, the text feature extractor and the video features extractor may generate a pair of video features vector and text features vector where each feature vector of the pair is aligned with the other feature vector of the pair.

At 814, provides a training data set to train an artificial neural network, for example an autoencoder. The training data set comprises a plurality of pairs of vectors, each pair of vectors corresponding to a respective one of a plurality of narratives and including a video features vector and a text features vector. The video features vector comprising a plurality of video descriptors extracted from a sequence of images of the corresponding narrative. The text features vector comprising a plurality of text descriptors extracted from a set of scene descriptions of the corresponding narrative and extracted from at least a portion of a script of the corresponding narrative. The video features vector and the text features vector of each pair are aligned with one another.

At 816, trains the computational system on the training data set to generate an artificial neural network (e.g., autoencoder) that has been trained on both the video features vectors and the text features vectors. This advantageously allows the capture of attributes an nuances of the narrative that exceed those typically represented in keyword-based searching approaches.

Optionally at 818, one processor-based transmits at least a first instance of the artificial neural network (e.g., autoencoder) that has been trained on both the video features vectors and the text features vectors to another processor-based system. For example, a processor-based system of an intermediary or other entity may transmit a first instance of an autoencoder that has been trained on both the video features vectors and the text features vectors to a respective processor-based system of one or more first entities, for example entities in which narratives are in production or will be produced. Such may occur, for example in the approach illustrated and described with respect to FIGS. 4, 5 and 6.

Optionally at 820, one processor-based transmits at least a first instance of the artificial neural network (e.g., autoencoder) that has been trained on both the video features vectors and the text features vectors to another processor-based system. For example, a processor-based system of an intermediary or other entity may transmit a second instance of an autoencoder that has been trained on both the video features vectors and the text features vectors to a respective processor-based system of one or more second entities, the second entity, for example entities which own or otherwise control respective libraries of legacy narratives, for instance source narrative material stored behind a network security or paywall wall. Such may occur, for example in the approach illustrated and described with respect to FIGS. 4 and 5.

Optionally at 822, one processor-based retains an instance of the artificial neural network (e.g., autoencoder) that has been trained on both the video features vectors and the text features vectors to another processor-based system. For example, a processor-based system of an intermediary or other entity may retain an instance of an autoencoder that has been trained on both the video features vectors and the text features vectors. Such may occur, for example in the approach illustrated and described with respect to FIG. 6.

The method 800 terminates at 824, for example until invoked again. In some implementations, the method 800 may repeat continually.

Figure 9:
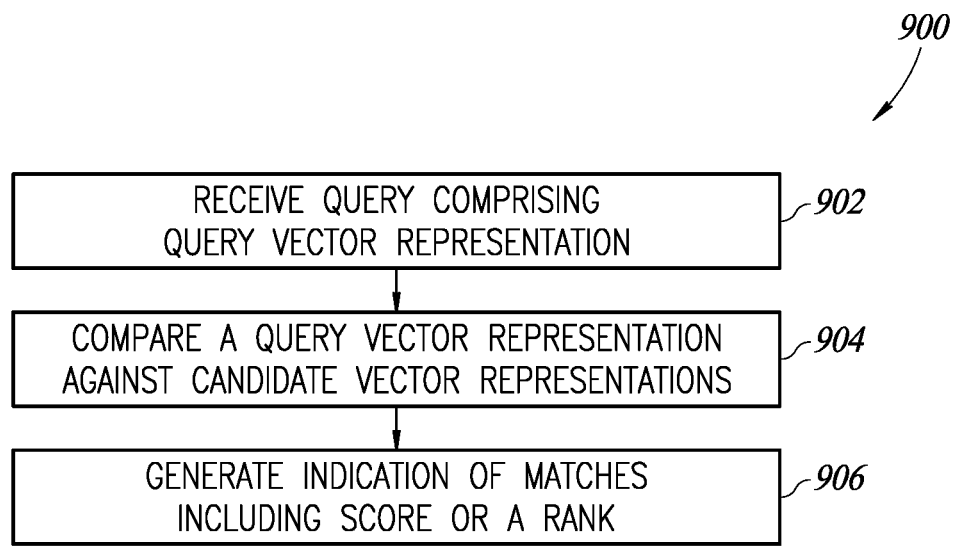
FIG. 9 is a flow diagram showing a method to perform script annotation to generate an annotated training corpus for machine learning, according to one illustrated embodiment.

FIG. 9 shows a method 900 of operation in a processor-based system, according to at least illustrated implementation.

At 902, a processor-based system receives a query comprising a query vector representation. For example, at a processor-based system of a second entity may receive a query generated by a processor-based system of a first entity including a query vector representation. The processor-based system of the first entity may generate the query vector representation via a video and text vector trained autoencoder. The processor-based system of the first entity may transmit the query to the processor-based system of the second entity, or may transmit the query to a processor-based system of an intermediary entity, which in turn forward the query to the processor-based system of the second entity. The query vector representation may, for example, be generated via a first instance of a video and text vector trained autoencoder operated by a first entity (e.g., an entity developing a narrative). The query vector representation may, for example, represent a query or inquiry regarding a narrative under development with incomplete information (e.g., scene missing video content, scene missing script content).

At 904, a processor-based system compares the query vector representation generated by at least a first instance of an autoencoder against a plurality of candidate vector representations generated via at least second instance of the autoencoder. The candidate vector representations may, for example, be generated via a second instance of the video and text vector trained autoencoder. The second instance of the video and text vector trained autoencoder may advantageously be operated by a second entity (e.g., an entity that owns or controls a library of legacy narratives). Alternatively, the second instance of the video and text vector trained autoencoder may advantageously be operated by an intermediary entity that operated between the first entity (e.g., an entity developing a narrative) and the second entity (e.g., an entity that owns or controls a library of legacy narratives). The plurality of candidate vector representations represent each of a plurality of candidate narratives.

The instances of the autoencoder are trained on a common training data set, facilitating the comparison of query vector representations and candidate vector representations. The training data set comprises a plurality of pairs of vectors, each pair of vectors corresponding to a respective one of a plurality of training narratives and including a video vector and a text vector, the video vector comprising a plurality of video descriptors extracted from a sequence of images of the corresponding training narrative and the text vector comprising a plurality of text descriptors extracted from a set of scene descriptions of the corresponding training narrative and extracted from at least a portion of a script of the corresponding training narrative, the video vector and the text vector of each pair aligned with one another.

At 906, a processor-based system generates an indication of any matches from the candidate vector representations with the query vector representation including at least one of a score or a rank of the respective match. For example, a processor-based system of a second entity (e.g., an entity that owns or controls a library of legacy narratives) may perform the compare of the candidate vector representations with the query vector representation. Alternatively, a processor-based system of an intermediate entity that operates between the first entity and the second entities (e.g., entities that own or control respective libraries of legacy narratives) may perform the compare of the candidate vector representations with the query vector representation. The indication of matches may be provided to the processor-based system of the first entity (e.g., an entity developing a narrative), which originated the query. Various techniques and approaches can be employed for comparing the vector representations.

Various processor-based systems are described herein, for example processor-based systems at each of one or more first entities, at each of one or more second entities and/or at each of one or more intermediate entities. Those processor-based systems may, for example, take the form of any computer system that is operable to implement the operations described or illustrated herein. The processor-based systems or computer system will at times be referred to in the singular herein, but this is not intended to limit the embodiments to a single device, since in typical embodiments, there may be more than one processor-based or computer system or devices involved.

Each processor-based or computer system may include one or more processing units, a system memory and a system bus that couples various system components including the system memory to the processing units. The processing units may be any logic processing unit, such as one or more central processing units (CPUs), digital signal processors (DSPs), application-specific integrated circuits (ASICs), field programmable gate arrays (FPGAs), etc. The system bus can employ any known bus structures or architectures, including a memory bus with memory controller, a peripheral bus, and a local bus. The system memory typically includes read-only memory ("ROM") and random access memory ("RAM"). A basic input/output system ("BIOS"), which can form part of the ROM, contains basic routines that help transfer information between elements within the processor-based or computer system, such as during start-up.

The processor-based or computer system may also include a plurality of interfaces such as network interfaces, modem interface, or any other wireless/wired interfaces.

The processor-based or computer system may include a hard disk drive for reading from and writing to a hard disk, an optical disk drive for reading from and writing to removable optical disks, and/or a magnetic disk drive for reading from and writing to magnetic disks. The optical disk can be a CD-ROM or DVD-ROM, while the magnetic disk can be any magnetic storage media. The hard disk drive, optical disk drive and magnetic disk drive may communicate with the processing unit via the system bus. The hard disk drive, optical disk drive and magnetic disk drive may include interfaces or controllers (not shown) coupled between such drives and the system bus, as is known by those skilled in the relevant art. The drives and their associated computer-readable storage media may provide nonvolatile and non-transitory storage of computer readable instructions, data structures, program modules and other data for the processor-based or computer system. Those skilled in the relevant art will appreciate that other types of computer-readable storage media that can store data accessible by a computer may be employed, such as flash memory, digital video disks ("DVD"), Bernoulli cartridges, RAMs, ROMs, smart cards, various solid state drives, etc. For example, computer-readable storage media may include, but is not limited to, random access memory (RAM), read-only memory (ROM), electrically erasable programmable read-only memory (EEPROM), flash memory, compact disc ROM (CD-ROM), digital versatile disks (DVD) or other optical disk storage, magnetic storage devices, solid state memory or any other medium which can be used to store the desired information and which may be accessed by processing unit(s).

Program modules can be stored in the system memory, such as an operating system; one or more application programs; other programs or modules; program data, generated data and artificial neural network training data; and artificial neural network program. Application programs along with the program data, generated data and artificial neural network training data, and artificial neural network program, may include instructions that cause the processor(s) to autonomously generate video and text feature vectors, train an artificial neural network (e.g., an autoencoder) on the video and text feature vectors, generate queries employing query vector representations of narratives, for instance narratives under development and generate candidate vector representations of narratives, for instance legacy narratives. Other program modules may include instructions for handling security such as password or other access protection and communications encryption. The system memory may also include communications programs, for example, a Web client or browser as part of the application programs 238 for permitting the processor-based or computer system to access and exchange data with sources such as Web sites of the Internet, corporate intranets, extranets, or other networks and devices as described herein, as well as other server applications on server computing systems.

The operating system, application programs, other programs/modules, program data, generated data and artificial neural network training data, and artificial neural network program can be stored in the system memory and/or stored on the hard disk of the hard disk drive, the optical disk of the optical disk drive and/or the magnetic disk of the magnetic disk drive, or other memory storage devices, such as solid state drives.

An operator, such as a user, can enter commands and information into the processor-based or computer system through input devices such as a touch screen or keyboard, an imager, a pointing device such as a mouse, and/or via a graphical user interface. Other input devices can include a touchpad, microphone, joystick, game pad, tablet, scanner, etc. These and other input devices are connected to one or more of the processing units through an interface such as a serial port interface that couples to the system bus 216, although other interfaces such as a parallel port, a game port or a wireless interface or a universal serial bus ("USB") can be used. A monitor or other display device is coupled to the system bus via a video interface, such as a video adapter. The processor-based or computer system can include other output devices, such as speakers, printers, etc.

The processor-based or computer system can operate in a networked environment using logical connections to one or more remote computers and/or devices associated with production operations as described above with reference to FIGS. 4, 5 and 6. For example, the processor-based or computer system can operate in a networked environment using logical connections to one or more mobile devices, landline telephones and other service providers or information servers. Communications may be via a wired and/or wireless network architecture, for instance wired and wireless enterprise-wide computer networks, intranets, extranets, telecommunications networks, cellular networks, paging networks, and other mobile networks.

Various approaches employed in the processor-based systems described herein advantageously use deep learning (also known as deep structured learning or hierarchical learning), which is part of a broader family of machine learning methods based on learning data representations using deep neural networks. A deep neural network is an artificial neural network with multiple hidden layers between the input and output layers and can model complex non-linear relationships. Deep neural network architectures generate compositional models where the object is expressed as a layered composition of primitives. The extra layers enable composition of features from lower layers, potentially modeling complex data with fewer units than a similarly performing shallow network. In some implementations, a processor-based system may generate an artificial neural network (e.g., autoencoder) based on deep learning to comprehend narratives. To generate the artificial neural network, the processor-based system performs a process that ingests video (e.g., a sequence of images, typically with associated sound), text, extracts key elements, for instance using natural language processing methods trained on data. The processor-based system learns by using a training corpus or database of video, scripts or stories (e.g., film, movies, television shows, interactive games). These may be obtained through a database dump, through scraping the Internet, and/or through application programming interfaces (APIs). The processor-based system may process narratives via a natural language processor trained on an annotated data set to produce a set of scene descriptors, video feature vectors, and/or text feature vectors, which may represent a number of scenes, a number of key entities and a number of key relationships that appear in the narrative.

The natural language processor may have been trained using supervised or unsupervised learning, or may perform supervised or unsupervised learning during operation. Supervised learning is the machine learning task of inferring a function from labeled training data and unsupervised learning is a type of machine learning algorithm used to draw inferences from datasets consisting of input data without labeled responses. The natural language processor may use supervised learning in that the data set used for training may be a set of labeled or annotated scripts used as training examples. The natural language processor may also, or instead, use unsupervised learning in that the data set used for training may, for instance comprise scripts that are not labeled. For example, when performing unsupervised learning, the processor-based system may use cluster analysis, which is used for exploratory data analysis to find hidden patterns or grouping in the key entities and relationships extracted from the scripts or other data used to train the natural language processor.

In one implementation, prior to the processing of a script, there exists categories of possible extracted items and each category is associated with a list of words and their variants belonging to that category. The process may then match the words in the category to words in the script. However, this may create false positives. Therefore, the processor-based system may employ a plurality of n-grams to process the narrative to understand context, where at least some of the n-grams comprise more than a single word. In using n-grams, the processor-based system determines what the probability is that an entity belongs to a particular category if it is surrounded by nearby words. The processor-based system may also characterize interactions between entities of the script. In scenes that contain one or more characters, the processor-based system determines the "sentiment" of the interaction of the characters. This may also be accomplished using n-grams to put the language in context and avoid misinterpretations that may happen when statements are taken out of context, such as when characters are using irony or sarcasm.

As noted herein, the processor-based system may generate respective vector representations for various elements regarding the narrative. For example, a sparse vector is a one-dimensional array of elements comprising a plurality of binary values in which most of the elements are zero. The processor-based system may use such sparse vectors to represent various types of data to be input to, or that are output from, nodes of artificial neural networks used in machine learning. For example, the processor-based system may use such sparse vectors to represent various elements regarding the video and/or the script, including, but not limited to, one or more of: extracted key entities of a narrative, each key entity of the narrative, each of the key relationships of the narrative, and each key entity and each of a number of sentiments of one or more characters in the narrative.

In at least some implementations, a processor-based system ingests a script, for example, in pdf or Final Draft format, and automatically generates a scene-by-scene representation of the script as a data structure (e.g., graph, records, linked lists, vectors).

Various predictions by the processor-based system may be performed using Bayesian inference. In such an embodiment, the processor-based system may generate a data structure that represents the extracted key entities and the extracted key relationships of the sample script as a Bayesian network. If $E_t = \{E_1, E_2, \ldots E_t\}$ is the history of all events (interactions, sentiment, actions) until time t, the processor-based system may use Bayesian inference to predict an event, "Joe and Steve start a fight" with a probability $P(E_{t+1} = \text{"Joe and Steve start a fight"} | E_t)$, given the history of all events until $E_t$. This may be solved recursively with Bayesian surprise according to $P(E_{t+1}|E_t) P(E_{t+1})$, where $P(E_{t+1})$ is the prior probability of event $E_{t+1}$ and $P(E_{t+1}|E_t)$ is evidence based on previous events in the story represented in the narrative of the sample script. The processor-based system determines that if $P(E_{t+1}|E_t) P(E_{t+1}) > T$ (a threshold), then such an event is surprising. Such information may be useful to the script writer, indicating that the event may either be intended to be surprising or, if not, perhaps more explanation is necessary to fill in a plot hole or lack of character exposition. The threshold, T, may be normalized to the type of story or genre represented in the sample script. T may be set higher for animation scripts and lower for drama scripts.

The artificial neural network may be trained on the corpus of one or more annotated scripts or portions of annotated scripts. Such annotated scripts may include both dialog and staging directions used in the training process, thus facilitating the processor-based system to perform natural language processing on the sample script to distinguish between dialog and staging directions in the sample script. The corpus of scripts annotated for training purposes may include annotations that distinguish between one or more of the following items that may appear in the corpus of scripts: a number of key entities, a number of key relationships, a number of sentiments, a number of actions, a number of effects, a number of instances of dialog, and a number of instances of staging directions. Such annotations facilitate the processor-based system to perform natural language processing on the sample script to distinguish between such items.

Some implementations may employ a feedforward artificial neural network. A feedforward artificial neural network is an artificial neural network wherein connections between the units do not form a cycle. In a feedforward artificial neural network the information moves in only one direction, forward, from the input nodes, through the hidden nodes in hidden layers, to the output nodes. There are no cycles or loops in the feedforward artificial neural network and thus, it is stateless. As such, it does not lend itself well to natural language processing because, being stateless, lacks the ability to retain information to provide the context and ability to learn conditional probabilities useful in processing sentences of natural language.

Some implementations may employ a recurrent artificial neural network. A recurrent artificial neural network maintains a state via the hidden layer, and thus is able to retain information to provide the context and ability to learn conditional probabilities useful in processing sentences of natural language. The processor-based system may use such learned conditional probabilities for words and sentences to generate text for the sample scripts. For example, the processor-based system may use such a recurrent artificial neural network to generate text, by running through words and sentences that it predicts have a high likelihood of appearing next based on the corpus of training data and the words and sentences read so far by the processor-based system from the sample script.

In at least some implementations, a processor-based system may implement an encoding and decoding process, for example for sentences, using an artificial neural network that is an autoencoder with LSTM. Each word and punctuation of the example sentences is provided at input nodes, which are provided to an encode layer and then to a decode layer to provide the decoded output at output nodes. The encode layer and decode layer takes each word and punctuation as it comes individually and encodes and decodes it without regard to any hierarchical relationship between words and sentences.

In at least some implementations, a processor-based system may implement an encoding and decoding process for sentences, using an artificial neural network that is a hierarchical variational autoencoder with LSTM for processing a script. The encoding and decoding process uses a hierarchical variational autoencoder that encodes and decodes according to a hierarchical relationship between words and sentences. In particular, each word and punctuation of the example sentences is provided at input nodes, and an encode-word layer first encodes just the words of the sentences and then an encode-sentence layer encodes the sentences after the words are encoded according to the punctuation of a period separating the sentences. This may also be referred to as a "recurrent encoder artificial neural network."

A decode process may work the same, but in reverse, first decoding the sentences at decode-sentence layer according to the punctuation of the period separating the sentences and then decoding the words of each sentence at the decode-word layer to provide the decoded output at output nodes. This may also be referred to as a "recurrent decoder artificial neural network" and may have a loss function that is a variational upper bound on a log-likelihood of the corpus of annotated scripts. This hierarchical nature of a hierarchical variational autoencoder with long short term memory may be useful to the processor-based system for treating sentences as separate, individual entities and learning conditional probabilities on a sentence by sentence basis, rather than just a word-by-word basis.

Some implementations may employ a restricted Boltzmann machine (RBM). An RBM is a generative stochastic artificial neural network that can learn a probability distribution over its set of inputs. In particular, the RBM may model the joint probability of inputs at input layer and outputs at output layer, represented as $P(x, y, \theta)$, to generate narrative content. In particular, the artificial deep neural network may be used to determine the probability distribution that gives the probability that each of x and y, representing entities extracted from scripts, falls in any particular range or discrete set of values represented by $\theta$. The artificial deep neural network may also be trained on an annotated data set to extract a number of key entities and a number of key relationships that appear in the narrative. In particular, the artificial deep neural network may use machine learning wherein the data set used for training may be a set of labeled or annotated scripts used as training examples. The processor-based system may provide functionality for annotating such scripts for training purposes in machine learning.

In some implementations, the processor-based system presents a script from the training corpus to be annotated in an interactive user interface screen. The script is presented with a plurality of terms in the presented portion of the script visually identified as compared with other terms in the portion of the script. The processor-based system may autonomously determine a category to which the term belongs and determine a set of human selectable annotations to present via a respective menu based on the determined category to which the term belongs. A user may move a cursor over one of the user selectable annotations in the context sensitive menu to select one of the user selectable annotations in the context sensitive menu.

The above description of illustrated embodiments, including what is described in the Abstract, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art. The teachings provided herein of the various embodiments can be applied to other systems, not necessarily the exemplary systems generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of non-transitory signal bearing media include, but are not limited to, the following: recordable type media such as, hard disk drives, DVD-ROMs, flash memory, and computer memory; and other non-transitory computer-readable storage media.

The various implementations described above can be combined to provide further implementations. All of the commonly assigned US patent application publications, US patent applications, foreign patents, and foreign patent applications referred to in this specification and/or listed in the Application Data Sheet are incorporated herein by reference, in their entirety, including but not limited to: U.S. Provisional Patent Application No. 62/616,354; U.S. Provisional Patent Application No. 62/616,364; U.S. patent application Ser. No. 16/244,979 (published as US 2019/0213254); and U.S. patent application Ser. No. 16/244,967 (published as US 2019/0213253).

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operation of a computational system that implements at least one artificial neural network, the method comprising:
comparing a query vector representation generated by at least a first instance of one autoencoder running on a first processor-based system, against a plurality of candidate vector representations generated by at least a second instance of the autoencoder running on a second processor-based system,
the query vector representation representing an inquiry regarding an incomplete narrative that lacks a portion of video or lacks a portion of text descriptors,
the plurality of candidate vector representations representing each of a plurality of candidate narratives,
the autoencoder trained on a training data set comprising a plurality of pairs of vectors, each pair of the vectors corresponding to a respective one of a plurality of training narratives and including a video vector and a text vector,
the video vector comprising a plurality of video descriptors extracted from a sequence of images of the corresponding training narrative and the text vector comprising a plurality of text descriptors extracted from a set of scene descriptions of the corresponding training narrative and extracted from at least a portion of a script of the corresponding training narrative, the video vector and the text vector of each pair aligned with one another; and
generating an indication of any matches from the candidate vector representations with the query vector representation including at least one of a score or a rank of the respective match.

2. The method of claim 1, further comprising receiving the inquiry at the second processor-based system of a second entity, wherein the query vector representation was generated via the first instance of the autoencoder at the first processor-based system of a first entity, and the comparing occurs at the second processor-based system of the second entity.

3. The method of claim 2, further comprising:
transmitting by the second processor-based system of the second entity to the first processor-based system of the first entity the indication of any matches from the candidate vector representations with the query vector representation including at least one of a score or a rank of the respective match.

4. The method of claim 2, further comprising:
receiving at least the second instance of the autoencoder at the second processor-based system of the second entity.

5. The method of claim 2, further comprising:
generating the candidate vector representations by at least the second instance of the autoencoder at the second processor-based system of the second entity from a set of source content including a plurality of source narratives stored behind a network wall of the second entity.

6. The method of claim 2, further comprising:
receiving at least the first instance of the autoencoder at the first processor-based system of the first entity.

7. The method of claim 1, further comprising:
transmitting at least the first instance of the autoencoder to the first processor-based system of a first entity; and
transmitting at least the second instance of the autoencoder to the second processor-based system of a second entity.

8. The method of claim 1, further comprising:
receiving the inquiry at a third processor-based system of an intermediary entity, wherein the query vector representation was generated via at least the first instance of the autoencoder at the first processor-based system of a first entity; and
receiving the candidate vector representations at the intermediary entity, where the candidate vector representations were generated by at least the second instance of the autoencoder at the second processor-based system of a second entity.

9. The method of claim 8 wherein the comparing occurs at the third processor-based system of the intermediary, and further comprising:
transmitting the indication of any matches from the candidate vector representations with the query vector representation including at least one of a score or a rank of the respective match by the third processor-based system of the intermediary entity to the first processor-based system of the first entity.

10. The method of claim 1, further comprising:
transmitting the inquiry from the first processor-based system of a first entity, the inquiry comprising the query vector representation, and wherein the query vector representation was generated via at least the first instance of the autoencoder and the candidate vector representations were generated by at least the second instance of the autoencoder; and
receiving by the first processor-based system of the first entity the indication of any matches from the candidate vector representations with the query vector representation including at least one of a score or a rank of the respective match.

11. The method of claim 1, further comprising:
generating the query vector representation by the first processor-based system of a first entity via the first instance of the autoencoder.

12. The method of claim 11 wherein generating the query vector representation by the first processor-based system of the first entity via the first instance of the autoencoder comprises: generating the query vector representation from the incomplete narrative that lacks a portion of the video.

13. The method of claim 11 wherein generating the query vector representation by the first processor-based system of the first entity via the first instance of the autoencoder comprises: generating the query vector representation from the incomplete narrative that lacks a portion of a script.

14. The method of claim 11 wherein generating the query vector representation by the first processor-based system of the first entity via the first instance of the autoencoder comprises: providing a video vector and a text vector to the first instance of the autoencoder.

15. The method of claim 11 wherein generating the query vector representation by the first processor-based system of the first entity via the first instance of the autoencoder comprises: automatically extracting a video vector from at least a portion of a sequence of images of at least a portion of the incomplete narrative.

16. The method of claim 11 wherein generating the query vector representation by the first processor-based system of the first entity via the first instance of the autoencoder comprises: automatically extracting a text vector from at least a portion of a portion of a script of the incomplete narrative.

17. The method of claim 11 wherein generating the query vector representation by the first processor-based system of the first entity via the first instance of the autoencoder comprises: automatically extracting a text vector from at least a portion of a description of at least one scene of at least a portion of the incomplete narrative.

18. The method of claim 11 wherein generating the query vector representation by the first processor-based system of the first entity via the first instance of the autoencoder comprises:
  automatically extracting one or more text descriptors of at least one scene of at least a portion of the incomplete narrative; and
  updating one or more of the automatically extracted text descriptors based on user input.

19. A computational system that implements at least one artificial neural network, the computational system comprising:
  at least one processor;
  at least one nontransitory processor-readable medium communicatively coupled to the at least one processor and that stores processor-executable instructions which, when executed by the at least one processor, cause the at least one processor to:
  compare a query vector representation generated by at least a first instance of one autoencoder running on a first processor-based system of a first entity against a plurality of candidate vector representations generated by at least a second instance of the autoencoder, the query vector representation representing an inquiry regarding an incomplete narrative that lacks a portion of video or lacks a portion of text descriptors, the plurality of candidate vector representations representing each of a plurality of candidate narratives, the autoencoder trained on a training data set comprising a plurality of pairs of vectors, each pair of the vectors corresponding to a respective one of a plurality of training narratives and including a video vector and a text vector, the video vector comprising a plurality of video descriptors extracted from a sequence of images of the corresponding training narrative and the text vector comprising a plurality of text descriptors extracted from a set of scene descriptions of the corresponding training narrative and extracted from at least a portion of a script of the corresponding training narrative, the video vector and the text vector of each pair aligned with one another; and
  generate an indication of any matches from the candidate vector representations with the query vector representation including at least one of a score or a rank of the respective match.

20. The computational system of claim 19 wherein, when executed, the processor-executable instructions further cause the at least one processor further to:
  generate the plurality of candidate vector representations from the plurality of candidate narratives using the second instance of the autoencoder at a second entity; and
  receive the inquiry from the first processor-based system of the first entity, wherein the compare occurs at the second entity.

21. The computational system of claim 20 wherein, when executed, the processor-executable instructions further cause the at least one processor further to:
  transmit to the first entity the indication of any matches from the candidate vector representations with the query vector representation including at least one of a score or a rank of the respective match.

22. The computational system of claim 20 wherein, when executed, the processor-executable instructions further cause the at least one processor further to:
  transmit at least the second instance of the autoencoder to the processor-based system of the second entity.

23. The computational system of claim 20 wherein the plurality of candidate narratives are derived from a set of source content including a plurality of source narratives stored behind a network wall of the second entity.

24. The computational system of claim 19 wherein when executed, the processor-executable instructions further cause the at least one processor further to:
  transmit at least the first instance of the trained autoencoder to the first processor-based system of a first entity; and
  transmit at least the second instance of the autoencoder to a second processor-based system of an intermediary entity.

25. The computational system of claim 19 wherein, when executed, the processor-executable instructions further cause the at least one processor further to:
  receive the inquiry from the first processor-based system of the first entity, the inquiry comprising the query vector representation, and wherein the query vector representation was generated via at least the first instance of the autoencoder and the candidate vector representations were generated by at least the second instance of the autoencoder; and
  transmit, to the processor-based system of the first entity the indication of any matches from the candidate vector representations with the query vector representation including at least one of a score or a rank of the respective match.

26. The computational system of claim 19 wherein the first processor-based system provides a video vector and a text vector to the first instance of the autoencoder.

27. The computational system of claim 26 wherein the first processor-based system automatically extracts the video vector from at least a portion of a sequence of images of at least a portion of the incomplete narrative.

28. The computational system of claim 26 wherein the first processor-based system automatically extracts the text vector from at least a portion of a portion of a script of the incomplete narrative.

29. The computational system of claim 26 wherein the first processor-based system automatically extracts the text vector from at least a portion of a description of at least one scene of at least a portion of the incomplete narrative.

30. The computational system of claim 19 wherein the first processor-based system automatically extracts one or more text descriptors of at least one scene of at least a portion of the incomplete narrative; and updates one or more of the automatically extracted text descriptors based on user input.

\* \* \* \* \*